United States Patent [19]
Peck et al.

[11] Patent Number: 5,746,395
[45] Date of Patent: May 5, 1998

[54] HELICOPTER SEAT SAFETY SYSTEM

[75] Inventors: Walter Richard Peck, Asheville; Ronald Wayne Oates, Hendersonville, both of N.C.

[73] Assignee: LME Inc., Annapolis, Md.

[21] Appl. No.: 546,073

[22] Filed: Oct. 20, 1995

[51] Int. Cl.$^6$ .......................... B64D 25/06; B64D 25/115
[52] U.S. Cl. .................... 244/121; 244/122 AG; 244/122 B; 297/216.17
[58] Field of Search .................. 244/122 R, 122 AG, 244/122 AH, 122 B, 121; 297/216.15, 216.16, 216.17

[56] References Cited

U.S. PATENT DOCUMENTS

| | | | |
|---|---|---|---|
| 2,480,335 | 8/1949 | Nordmark | 244/122 B X |
| 2,650,655 | 9/1953 | Neahr et al. | 244/122 B X |
| 2,953,189 | 9/1960 | Barash | 297/216.17 |
| 2,992,790 | 7/1961 | Cushman et al. | 244/122 B X |
| 3,077,324 | 2/1963 | Strickland, Jr. | 244/122 B |
| 3,386,683 | 6/1968 | Howland | 244/122 R X |
| 3,389,873 | 6/1968 | Filippi et al. | 244/122 R X |
| 3,698,670 | 10/1972 | Ewing | 244/122 AG |
| 3,905,615 | 9/1975 | Schulman | 244/122 B X |
| 4,437,628 | 3/1984 | Schwartz | 244/122 AG |
| 4,667,904 | 5/1987 | Herndon | 244/122 AG X |
| 4,747,565 | 5/1988 | Spinosa et al. | 244/122 B |
| 5,362,098 | 11/1994 | Guill | 244/122 AG X |

FOREIGN PATENT DOCUMENTS

| | | | |
|---|---|---|---|
| 0 351 568 | 1/1990 | European Pat. Off. | |
| 2 495 101 | 6/1982 | France | |
| 1264502 | 3/1992 | U.S.S.R. | 244/122 B |

*Primary Examiner*—William Grant
*Attorney, Agent, or Firm*—Foley & Lardner

[57] ABSTRACT

A helicopter safety system provides an increased likelihood of survivability without injury during "survivable" helicopter crashes. The system provides spinal compression for precompressing an operator's spine in response to a crash signal from a crash sensor. Also included is a strap tensioning device which tensions an inertia reel strap and thus restraining the operator's upper body more effectively in the helicopter seat. Preferably, the strap tensioning device is initiated simultaneously with the spinal compression. Also included are energy absorbers connected to the seat pan, for example, between the seat pan and the seat frame, and airbags connected to the harness. The harness also includes a cross coupling element to provide for a lateral support configuration.

14 Claims, 5 Drawing Sheets

HELICOPTER SEAT SAFETY SYSTEM

BACKGROUND OF THE INVENTION

The invention is directed to helicopter seats and, more particularly, an apparatus and method for reducing the likelihood of spinal injury to a helicopter seat occupant, such as a pilot or passenger, upon the occurrence of a helicopter crash.

Crash landings of helicopters can be placed into three categories. A first category is an uncontrolled crash wherein the helicopter impacts the ground at a high velocity. Helicopter pilots and passengers are not expected to survive such a crash. A second category is a "hard landing" wherein the pilot is in virtually complete control of the helicopter and wherein there is little or no physical damage to the helicopter upon impact with the ground. Pilots and passengers can be expected to survive a hard landing without injury.

A third category of crash landing, a "survivable crash," has an impact which is not as severe as an uncontrolled crash, but is more severe than a hard landing. A survivable crash results in physical damage to the helicopter and may result in injury to the helicopter pilot or passengers. Survivable crashes can be defined as crashes wherein the helicopter impacts the ground with sufficient velocity to cause physical damage to the helicopter, and wherein the helicopter impacts the ground with a vertical velocity less than or equal to 41 feet per second. Often, although the helicopter pilot and passengers can be expected to survive such an impact, they are likely to sustain injuries, such as spinal injuries, due to forces transferred to their buttocks through the helicopter fuselage and helicopter seats upon impact of the helicopter with the ground.

SUMMARY OF THE INVENTION

It is thus an object of the invention to provide a helicopter seat safety system which reduces the likelihood of spinal injury to helicopter pilots or passengers during survivable helicopter crashes. To achieve this object of the invention, one embodiment according to the invention provides an inertia reel and strap tensioning means. Upon the occurrence of a specific emergency operational condition, specifically, a crash condition, these elements tension an inertia reel strap to support the upper body of a seat occupant against forward motion and apply force on the upper body of the seat occupant toward the back of the seat. If the applied force is sufficient, the upper body of the seat occupant will be pulled toward the back of the seat. This embodiment of the invention can further include a crash sensor, such as an omnidirectional crash sensor, which triggers the strap tensioning means upon sensing the crash condition.

A second embodiment according to the invention includes a spinal compression means connected to the seat pan upon which the pilot or passenger is sitting. The spinal compression means will be triggered, in response to the crash sensor, to push the seat pan in an upward direction as a result of the crash condition. This second embodiment includes a ballistic charge, such as a two-component powder charge, including, for example, a first component of very fast burning pistol powder and a second component of slower burning rifle powder. In one example, the second embodiment can be integrated with the first embodiment such that upward movement of the seat produced by the thrusting and elongation of the spinal compression means will cause tensioning of the inertia reel strap of the first embodiment.

A third embodiment according to the invention includes a combination of the first and second embodiments, and may further include a controller for controlling the respective initiation of the strap tensioning means and the spinal compression means. The controller may also control the firing of the components of the powder charge. The controller can, for example, control the firing of the components of the two-component powder charge to commence simultaneously. The controller can also cause the strap tensioning means and spinal compression means to be initiated simultaneously or at different times. For example, the controller can initiate the spinal compression means at a time before the strap tensioning means is initiated or at the same time that the strap tensioning means is initiated.

A fourth embodiment according to the invention includes, either alone or in combination with the aforementioned embodiments, a harness system including a first belt, a second belt and a cross coupling element for maintaining a crossing orientation of the first belt and second belt in an area proximate to the upper back of a seat occupant in order to counteract the effects of lateral forces upon a seat occupant during a survivable crash. Each of the first and second belts is connected to a respective rear section of the seat pan, passes through the cross coupling element proximate to the upper back of the seat occupant, passes over a respective shoulder of the seat occupant and is then connectable to a multi-point buckle positioned near the waist of the seat occupant.

A still further embodiment according to the invention includes, alone or in combination with the aforementioned embodiments, an airbag connected to part of a harness, for example, the portion of a harness which is proximate to an occupant's upper chest or head. The airbag is inflated as a result of the occurrence of the crash condition. For example, the airbag can be inflated in response to the crash sensor. The airbag can be connected to, for example, the first belt, the second belt, or the first and second belt of the harness system.

BRIEF DESCRIPTION OF THE DRAWINGS

These and other objects and advantages of the invention will be apparent upon review of the following detailed description and drawings, wherein.

DETAILED DESCRIPTION

Figure 1:
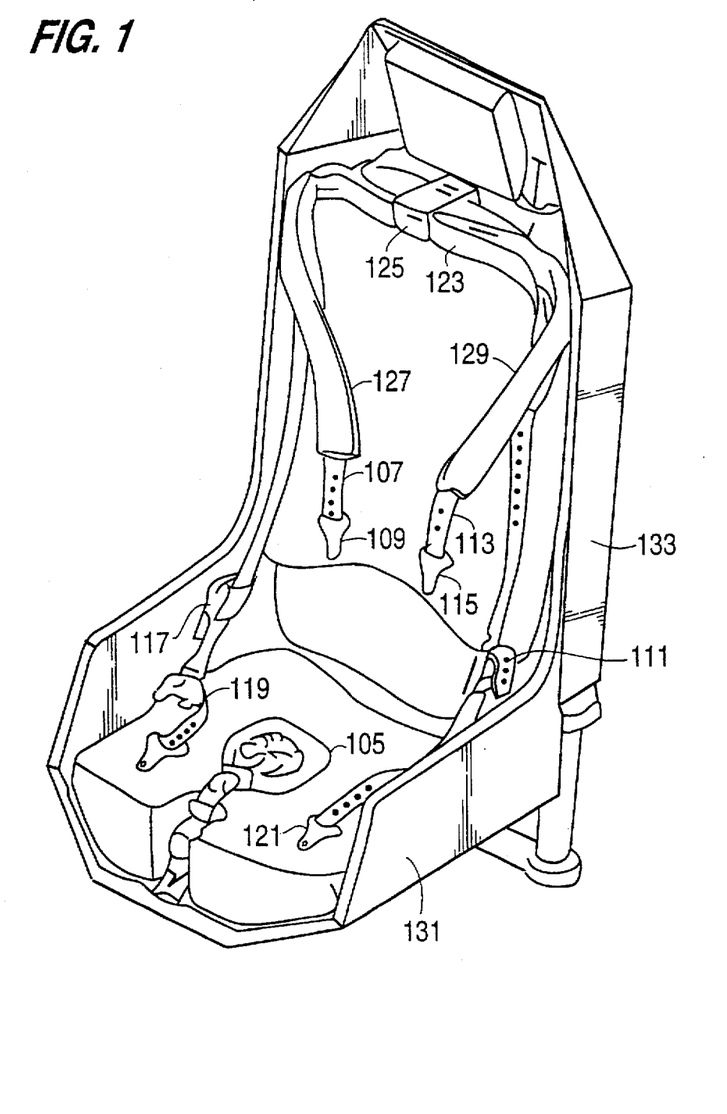
FIG. 1 shows a helicopter seat according to the invention.

FIG. 1 shows an embodiment of a helicopter seat according to the invention. The helicopter seat shown in FIG. 1 includes a harness system. The harness system includes multi-point buckle 105, which has a plurality of receptacles. One receptacle of multi-point buckle 105 is for connecting, in operation, with a first buckle connector 109 at one end of first belt 107. First belt 107 has a belt length adjuster 111 near a second end thereof. Multi-point buckle 105 also has a receptacle for connecting with buckle connector 115 at one end of second belt 113. Second belt 113 has a belt length adjuster 117 proximate to its second end. Multi-point buckle 105 also has receptacles for receiving buckle connectors of lap belts 119 and 121.

First belt 107 and second belt 113 pass through cross coupling element 123 which maintains a crossing orientation of first belt 107 and second belt 113. During operation, cross coupling element 123 maintains a region of intersection between first belt 107 and second belt 113 proximate to the upper back of a seat occupant.

Figure 1A:
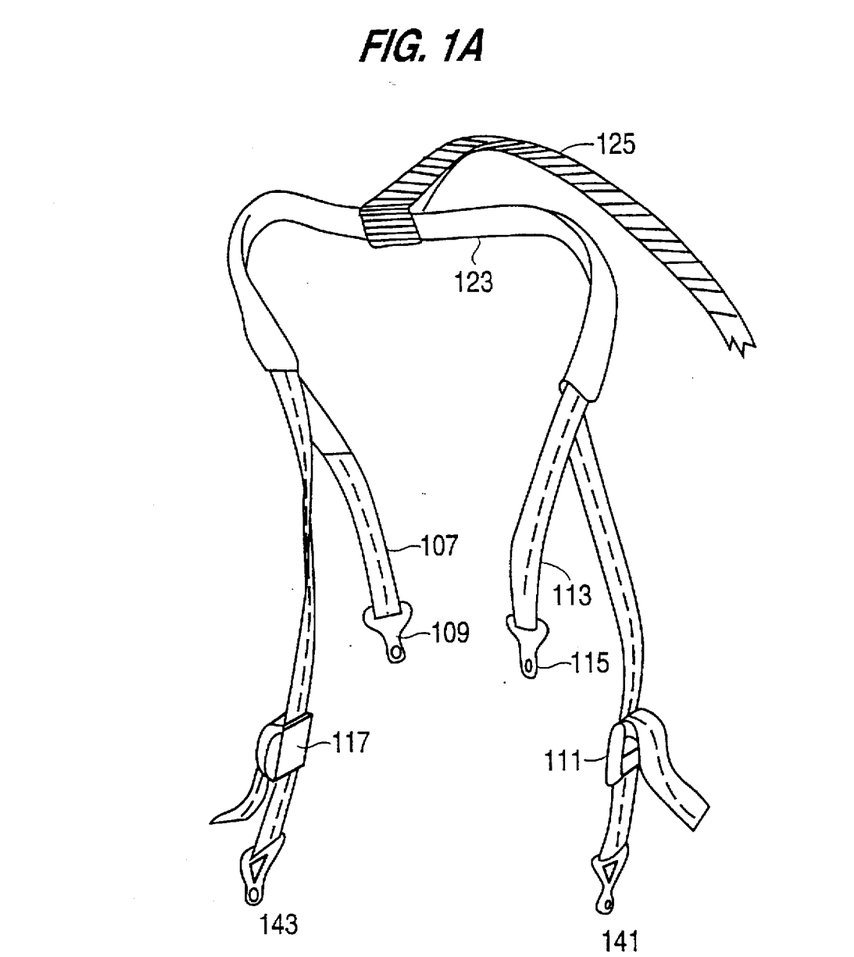
FIG. 1A shows a harness system according to the invention.

For illustrative purposes, FIG. 1A shows first belt 107, second belt 113 and cross coupling element 123 of the harness system as a unit, unattached to the helicopter seat. FIG 1A also shows anchor elements 141 and 143 at the second ends of first belt 107 and second belt 113, respectively. Anchor elements 141 and 143 are for connecting first belt 107 and second belt 113 to a helicopter seat.

Also shown in FIGS. 1 and 1A is inertia reel strap 125 connected to cross coupling element 123. Inertia reel strap 125 is connected to an inertia reel such that, in operation, a seat occupant has relative freedom of movement in forward and lateral directions as long as the inertia reel is in an unlocked state. However, when a sudden impulsive force pulls inertia reel strap 125 from the inertia reel, the inertia reel locks inertia reel strap 125 in place and thus prevents additional forward or lateral movement of the seat occupant. The harness system of this embodiment provides an advantage compared to conventional helicopter seat harnesses which merely restrict forward movement of a seat occupant upon the locking of an inertia reel. Using the harness system of this embodiment, lateral movement of the seat occupant is also restricted upon locking of the inertia reel. Thus, injuries caused by excess lateral movement of a seat occupant during a crash can be minimized by using the harness system of this embodiment. FIG. 1 also shows airbags 127 and 129 positioned respectively over first belt 107 and second belt 113, such that, in operation, airbags 127 and 129 are positioned proximate to the upper chest region of a seat occupant. Also, as shown, the outer structure of the helicopter seat includes a seat pan 131 and a seat frame 133.

Figure 2:
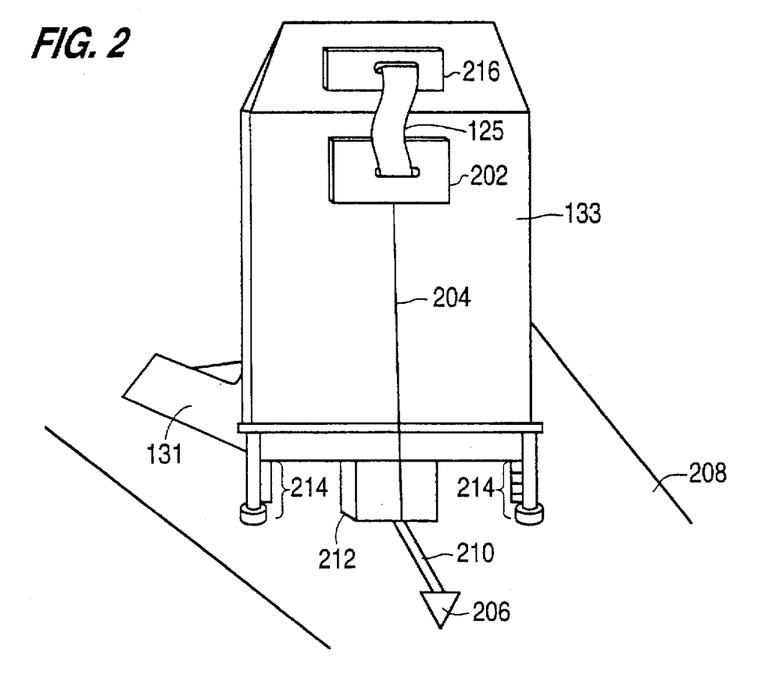
FIG. 2 shows a rear view of the helicopter seat of FIG. 1 in one embodiment according to the invention.

FIG. 2 shows a rear view of another embodiment of a helicopter seat according to the invention. In this embodiment, each of the elements shown in FIG. 1 is maintained. However, in this embodiment, inertia reel strap 125 connects to inertia reel 216 after passing through strap tensioning means 202.

Strap tensioning means 202 can operate in conjunction with inertia reel 216. Inertia reel strap 125 is connected to inertia reel 216 through strap tensioning means 202, such that the inertia reel 216, when locked, prevents additional unreeling of inertia reel strap 125. The strap tensioning means 202, when initiated or triggered, tightens inertia reel strap 125, thereby preventing undesired movement of the seat occupant due to slack in or elongation under load of the inertia reel strap 125. Further, when strap tensioning means 202 is triggered, such that slack is removed from inertia reel strap 125, the resulting force applied to the seat occupant may pull the upper body of the seat occupant in a backward direction, i.e. toward a back of the helicopter seat.

In the example shown in FIG. 2, strap tensioning means 202 is mounted to seat frame 133. Strap tensioning means 202 is connected, via wire 204, to crash sensor 206. Crash sensor 206 may be, for example, an omnidirectional crash sensor, and may be mounted, for example, to fuselage 208 of a helicopter. In this example, crash sensor 206 is also connected, via wire 210, to spinal compression means 212, which is positioned under seat frame 133. Energy absorbers 214 are positioned below seat pan 131 and connect to the seat frame 133 through, for example, a slideable ratchet means. Alternatively, energy absorbers 214 can be positioned above seat pan 131 or between seat pan 131 and seat frame 133.

Figure 3:
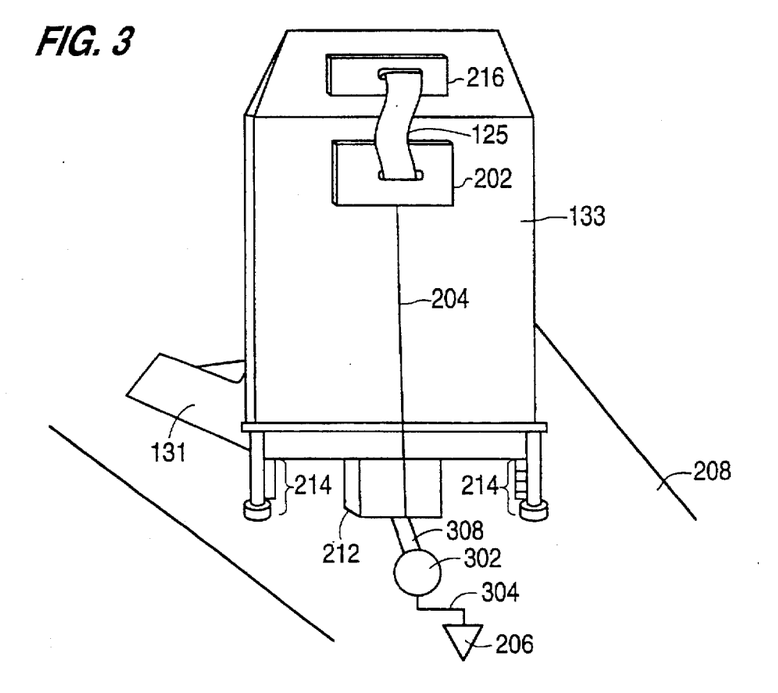
FIG. 3 shows a rear view of the helicopter seat of FIG. 1 in an alternative embodiment according to the invention.

FIG. 3 shows an alternative connection of crash sensor 206 to strap tensioning means 202 and spinal compression means 212. In this example, crash sensor 206 is connected to controller 302 via wire 304. Controller 302 is then connected, via wires 306 and 308, to strap tensioning means 202 and spinal compression means 212, respectively. Controller 302, in response to a signal received from crash sensor 206 via wire 304, then controls the initiation of spinal compression means 212 and strap tensioning means 202 by outputting appropriate signals via wires 306 and 308.

Figure 4:
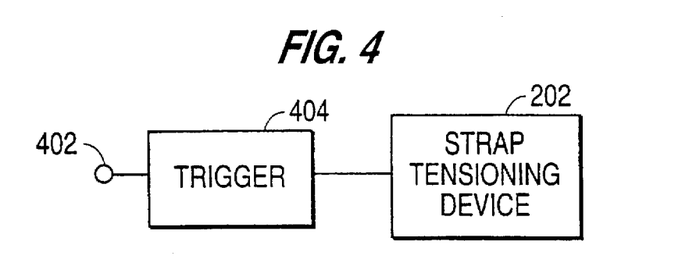
FIG. 4 shows a block diagram of a strap tensioning means shown in FIGS. 2 and 3.

FIG. 4 shows a block diagram of strap tensioning means 202. As shown, terminal 402 is an input terminal for a connection to controller 302, in the embodiment of FIG. 3, via wire 306, or connection to crash sensor 206, via wire 204, in the embodiment of FIG. 2. Trigger 404 is connected to terminal 402 and receives an input signal therefrom. Trigger 404 then provides energy to strap tensioning means 202 to tension inertia reel strap 125, thereby removing slack from inertia reel strap 125 and preventing the upper body of a seat occupant from moving further outward away from seat frame 133. The removal of slack from inertia reel strap 125 may also cause the upper body of the seat occupant to move in a rearward direction, i.e. toward the back (or frame 133) of the seat. Trigger 404 can be, for example, a gas trigger or a spring-powered energy source, such as a spring powered plunger of sufficient thrust and stroke to provide the desired tensioning of inertia reel strap 125.

Figure 5:
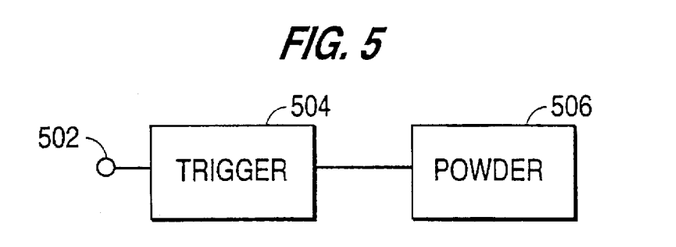
FIG. 5 shows a block diagram of a spinal compression unit shown in FIGS. 2 and 3.

FIG. 5 shows a block diagram for spinal compression means 212 shown at the bottom of seat frame 133 in FIG. 2. Terminal 502 receives an input signal. In the example of FIG. 3, the input signal is received from controller 302 over wire 308. In the example of FIG. 2, the input signal is received from crash sensor 206 via wire 210. Trigger 504 receives the input signal and initiates the firing of, for example, powder charge 506. Powder charge 506 preferably includes pistol powder. Optionally, rifle powder may be mixed with the pistol powder of powder charge 506. Since pistol powder burns as much as nine times faster than rifle powder, a mixture of pistol powder and rifle powder results in the fast burning pistol powder producing a rapid pressure rise to immediately power a short stroke piston. The slow burning rifle powder provides gas generation throughout the total stroke of the piston and thereby maintains the pressure acting on the short stroke piston as the pressurized volume increases, due to piston motion, at an ever increasing rate.

Thus, the ratio of such a mixture can be varied to provide the optimal spinal compression for the weight of a given crewmember. Alternatively, a ratio can be selected which provides optimal spinal compression for a range of crewmember weights, such as the range of acceptable crewmember weights defines as being from a small female seat occupant to a large male seat occupant. For example, computer studies have shown that using a mixture with between 7.5% and 60% pistol powder is effective. The percentage which is optimal depends upon, for example, an initial empty volume of the short stroke piston. Since the powder mixture is in a common chamber associated with the short stroke piston, the pistol powder and rifle powder begin to burn simultaneously. However, since the pistol powder burns faster than the rifle powder, it provides, in addition to the desired rapid pressure rise, more reliable and repeatable ignition as compared to that achieved by using 100% rifle powder. Thus, although the invention encompasses the use of 100% rifle powder, the use of pistol powder alone or in combination with rifle powder provides means for optimizing the force-time history of the spinal compression for the total pilot population.

Figure 6:
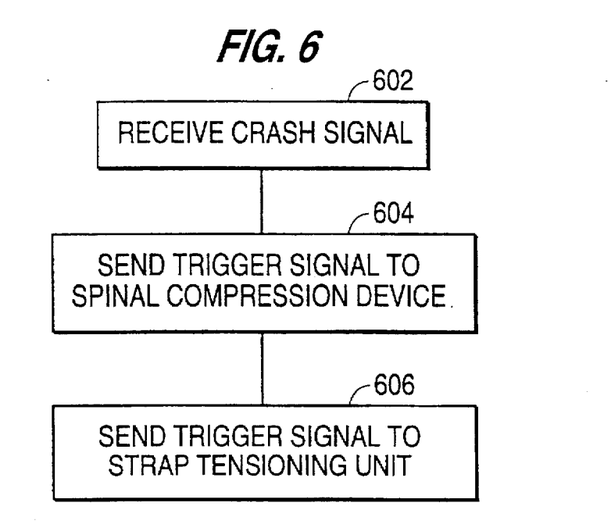
FIG. 6 shows a flowchart of operations of controller 302 shown in FIG. 3.

FIG. 6 shows an example of a flowchart of operations within controller 302 in controlling strap tensioning means 202 and spinal compression means 212 for the embodiment of FIG. 3. In step 602, controller 302 receives a crash signal from crash sensor 206 over wire 304. In step 604, controller 302 sends a trigger signal to spinal compression means 212 over wire 308. Subsequently, or simultaneously, in step 606, controller 302 sends a trigger signal to strap tensioning means 202 over wire 306. Controller 302 thus provides for sequential or simultaneous triggering of spinal compression means 212 and strap tensioning means 202. It is important to proper functioning of spinal compression means 212, that it be initiated as early in the crash event as possible in order that spinal precompression has occurred by the time the crash accelerations have reached injurious levels. It is also important, but less so, that strap tensioning means 202 be initiated as early in the crash pulse as possible.

When triggered, spinal compression means 212 rapidly pushes seat pan 131 in an upward direction, thereby precompressing the spine of a seat occupant. This precompression occurs during the initial stages of the crash and prior to the receipt by the seat occupant of the full impact forces due to the collision of the helicopter with the ground. Spinal precompression will reduce or eliminate overshoot in the spinal compression and thus reduce the z-axis dynamic response index of the seat occupant, and thereby reduce the likelihood of spinal injury to the seat occupant in a survivable crash event.

In one alternative embodiment according to the invention, seat frame 133 is coupled to seat pan 131 such that seat frame 133 moves in an upward direction along with seat pan 131 throughout the stroke of spinal compression means 212. In an alternative configuration, after the seat pan 131 and seat frame 133 have reached the maximum upward stroke of the spinal compression means 212, seat pan 131 is decoupled from seat frame 133 such that seat frame 133 will be locked into the position of maximum upward stroke relative to the cockpit floor while seat pan 131 moves independently of seat frame 133.

To further protect a seat occupant from spinal injury, one or more energy absorbers 214 (FIGS. 2 and 3) can be connected between seat pan 131 and seat frame 133 to absorb energy as seat pan 131 travels toward the cockpit floor 208 after seat pan 131 has completed its upward motion relative to the cockpit floor that resulted from spinal compression means 212. Preferably, energy absorbers 214 can be configured in a graduated fashion such that the initial energy absorber force level is less than the later energy absorber force levels which rise in steps during the stroke of the energy absorbers. This configuration will yield force levels and energy absorber stroke lengths on seat pan 131 corresponding to the mass of the seat occupant. For example, a smaller mass occupant will cause deformation of the energy absorbers at a lower force level, but will not cause deformation of the energy absorbers at the higher force levels. A higher mass occupant, on the other hand, would cause deformation of energy absorbers through the total low force to high force energy absorbers stroke.

Thus, a method according to the invention employs spinal compression in which a seat pan is pushed upwards in response to a sensed condition. The pushing step includes pushing a seat frame which is in fixed engagement with the seat pan and releasing the seat pan from the fixed engagement with the seat frame after completion of the pushing step. The pushing step results in an increase of the spacing between the seat pan and the cockpit floor such that the distance available for the stroke of the energy absorbers is increased to allow removal of a greater velocity from the seat occupant with the same force levels and the same injury probability. The increase in spacing and distance available for the stroke of the energy absorbers resulting from the pushing step also allows removal of the same velocity from the seat occupant with the lower force levels and a lower injury probability.

The pushing step also results in a decrease of the downward velocity of the seat pan and the buttocks of the seat occupant during the very early portion of the crash event with subsequent release of the seat pan from the seat frame. Only earth gravity is active on the seat pan and the seat occupant for a very short period of time. This provides precompression of the spine of the seat occupant to a desired level with a very negligible probability of injury. Further, the energy content of the velocity of the seat occupant which must be removed subsequently by the energy absorbers is greatly reduced and the injury probability to the seat occupant is even further reduced. The total combined effect is to vastly reduce the probability of injury to the seat occupant in any survivable crash condition.

Further protection from injury is provided by airbags 127 and 129 (FIG. 1), which can also be connected to crash sensor 206 or controller 302. Thus, airbags 127 and 129 can be inflated in response to a crash signal at, for example, the same time the initiation of strap tensioning means 202 and spinal compression means 212 takes place.

As shown in the embodiments of FIGS. 2 and 3, strap tensioning means 202 and spinal compression means 212 are triggered independently, either by crash sensor 206 (FIG. 2) or by controller 302 (FIG. 3). Alternatively, spinal compression means 212 and strap tensioning means 202 can be physically integrated such that strap tensioning means 202 is passive and causes tensioning of inertia reel strap 125 in response to the upward stroke of seat frame 133 produced by the stroking of the spinal compression means 212.

Figure 7A:
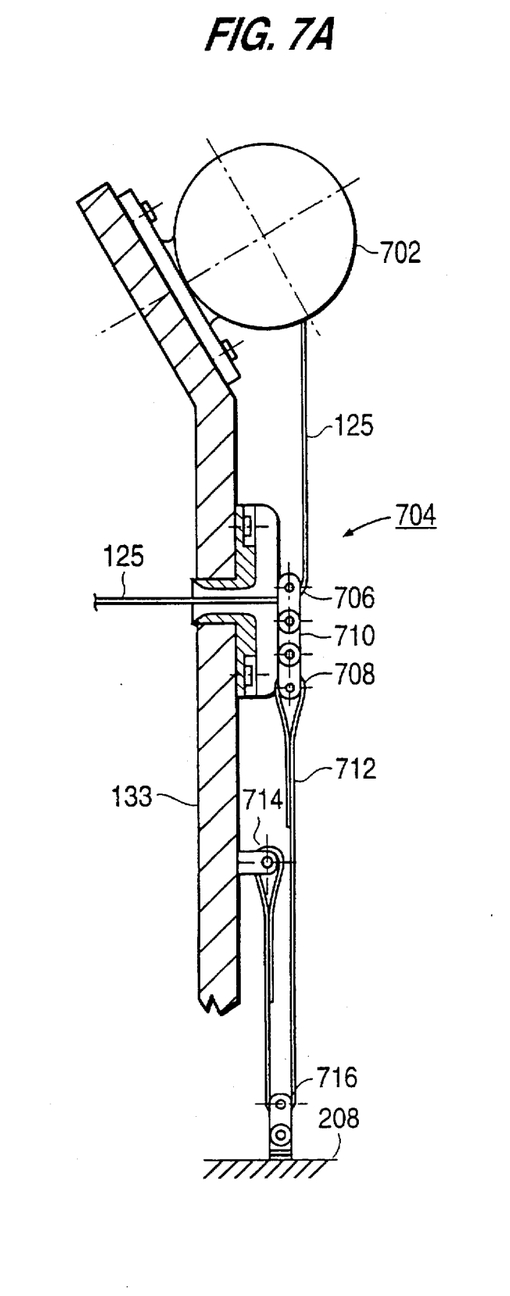
FIGS. 7A and 7B show an embodiment according to the invention wherein a passive strap tensioning means is operated in response to stroking of the spinal compression means which moves the seat frame upward relative to the cockpit floor.
Figure 7B:
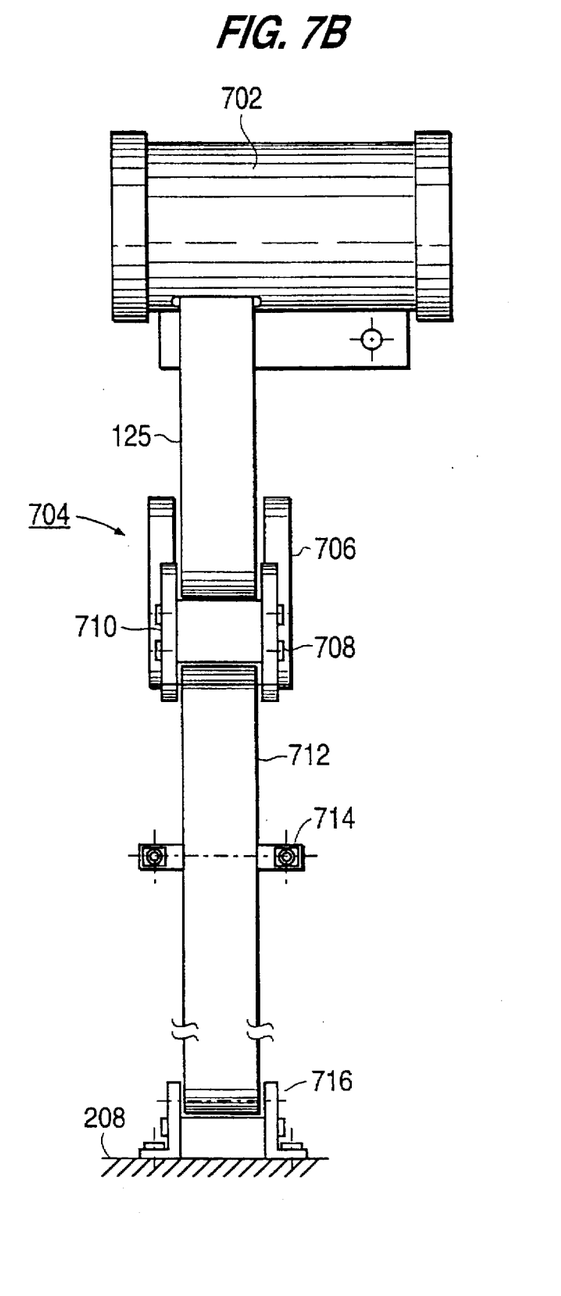

For example, FIGS. 7A and 7B respectively show a side view and a rear view of one detailed implementation. Inertia reel 702 is positioned near the top of seat frame 133 and performs inertia reel functions comparable to those described above relative to inertia reel 216 in FIGS. 2 and 3, thereby permitting freedom of movement of inertia reel strap 125 unless inertia reel 702 is locked in response to an impulsive acceleration or velocity. Inertia reel strap 125 passes through strap tensioning means 704 and through seat frame 133 to connect to the other members of the seat harness, as shown, for example, in FIGS. 1 and 1A.

Strap tensioning means 704 includes an upper roller 706, a lower roller 708, slideable block 710, and motion doubling strap 712 which is connected at one end to lower roller 708 and is connected at a second end to bracket 714. Bracket 714 is connected to seat frame 133. Motion doubling strap 712 passes through floor-mounted bracket 716 from lower roller 708 and bracket 714.

During a crash condition, inertia reel 702 will lock and spinal compression means 212 (FIG. 2) will be initiated, thereby causing seat frame 133 to be thrust upward relative to cockpit floor 208. As a result, slideable block 710 will move downward relative to seat frame 133, thereby causing tensioning of inertia reel strap 125. In the example shown, inertia reel strap 125 will be tensioned through approximately twice the distance of relative movement between slideable block 710 and seat frame 133. By the influence of motion doubling strap 712, inertia reel strap 125 will be tensioned through a distance almost four times the relative movement between the seat frame 133 and the cockpit floor 208. An advantage of this embodiment is that the strap tensioning means is passive, simple in construction, and does not require a dedicated energy source or initiation input.

The above-described embodiments according to the invention increase the likelihood of a helicopter seat occupant surviving a survivable crash without spinal injury. One or more of the spinal compression means, strap tensioning means, energy absorbers and airbags, and preferably all of the above, substantially increase the likelihood of surviving such a crash without injury.

While several embodiments of the invention have been described, it will be understood that the invention is capable of further modifications, and this application is intended to cover any variations, uses, or adaptations of the invention, following in general the principles of the invention and including such departures from the present disclosure as to come within knowledge or customary practice in the art to which the invention pertains, and as may be applied to the essential features hereinbefore set forth and falling within the scope of the invention or the limits of the appended claims.

What is claimed is:

1. A helicopter seat safety system comprising:
    a harness, including an inertia reel strap; and
    a strap tensioning means engaged with the inertia reel strap, a cockpit floor and a seat frame of the helicopter seat;
    wherein the strap tensioning means tensions the inertia reel strap as a result of the occurrence of a specific operational condition, such that an upper body of a seat occupant is pulled toward a back of the helicopter seat;
    a seat pan for supporting the buttocks of a seat occupant, and a spinal compression means coupled to the seat pan, wherein the spinal compression means pushes the seat pan in an upward direction relative to the cockpit floor as a result of the occurrence of the specific operational condition; and
    the seat frame being coupled to the seat pan and driven by the spinal compression means such that pushing of the seat frame in the upward direction relative to the cockpit floor causes the strap tensioning means to tension the inertia reel strap.

2. A helicopter seat safety system as recited in claim 1, wherein the strap tensioning means comprises:
    a slideable block;
    an upper roller connected to one end of the slideable block;
    a lower roller connected to a second end of the slideable block;
    a floor-mounted bracket;
    a seat frame-mounted bracket; and
    a motion doubling strap,
    wherein the upper roller is engaged with the inertia reel strap, the motion doubling strap is connected to the lower roller at a first end and to the seat frame-mounted bracket at a second end, and the motion doubling strap is engaged with the floor-mounted bracket intermediate the first end and the second end.

3. A helicopter seat safety system comprising:
    a seat pan for supporting a buttocks of a seat occupant;
    a seat frame coupled to and supporting the seat pan;
    a spinal compression means connected to the seat frame, wherein the spinal compression means pushes the seat frame and the seat pan in an upward direction as a result of the occurrence of a specific operational condition,
    a crash sensor for sensing, as the specific operational condition, a crash condition, wherein the crash sensor causes the spinal compression means to be initiated as a result of sensing of the crash condition,
    wherein the spinal compression means includes a ballistic powder charge which is initiated as a result of the crash sensor sensing the crash condition.

4. A helicopter seat safety system as recited in claim 3, further comprising a controller connected to the crash sensor and the ballistic powder charge of the spinal compression means, the controller controlling the initiation of the ballistic powder charge of the spinal compression means in response to the crash sensor.

5. A helicopter seat safety system as recited in claim 4, wherein the ballistic powder charge has at least two different types of powder.

6. A helicopter seat safety system as recited in claim 5, wherein a first powder type of the ballistic powder comprises fast burning pistol powder and a second powder type of the ballistic powder comprises slower burning rifle powder.

7. A helicopter seat safety system as recited in claim 6, wherein the controller controls initiation of the ballistic powder to simultaneously commence firing of the first powder type and the second powder type.

8. A helicopter seat safety system comprising:
    a seat pan for supporting a buttocks of a seat occupant;
    a seat frame coupled to and supporting the seat pan; and
    a spinal compression means connected to the seat frame, wherein the spinal compression means pushes the seat frame and the seat pan in an upward direction as a result of the occurrence of a specific operational condition;
    an energy absorber coupled to the seat pan, the energy absorber deforming to absorb energy when a downward force on the seat pan exceeds a predetermined threshold;
    a harness, including an inertia reel strap;
    a strap tensioning means engaged with the inertia reel strap such that the strap tensioning means tensions the inertia reel strap as a result of the occurrence of the specific operational condition;
    a first belt having a first end and a second end, the first end of the first belt being connected to a right-rearward section of the seat pan, the second end of the first belt comprising a first buckle connector;
    a second belt having a first end and a second end, the first end of the second belt being connected to a left-rearward section of the seat pan, the second end of the second belt comprising a second buckle connector;
    a multi-point buckle having a first receptacle on a left side for receiving the first buckle connector and a second receptacle on a right side for receiving the second buckle connector;
    a cross coupling element for maintaining a crossing orientation of the first belt and the second belt in a region of intersection between the first belt and the second belt; and an airbag connected to at least one of the first belt and the second belt, the airbag being inflated as a result of the occurrence of the specific operational condition.

9. A method of protecting an occupant of a helicopter seat during a crash condition, comprising the steps of:

sensing the crash condition via a crash sensor;

tensioning an inertia reel strap to restrain the occupant's upper body in response to the sensed crash condition; and pushing a seat pan upwards in response to the sensed crash condition;

wherein the pushing and tensioning steps occur in a predetermined sequence and;

wherein the pushing step commences simultaneously with the tensioning step.

10. A method of protecting an occupant of a helicopter seat during a crash condition, comprising the steps of:

sensing the crash condition via a crash sensor;

tensioning an inertia reel strap to restrain the occupant's upper body in response to the sensed crash condition: and pushing a seat pan upwards in response to the sensed crash condition and;

pushing a seat frame which is in fixed engagement with the seat pan, and releasing the seat pan from the fixed engagement with the seat frame.

11. A method as recited in claim 10, wherein the releasing step commences after completion of the pushing step.

12. A method as recited in claim 10, the pushing further comprising increasing spacing between the seat pan and the cockpit floor thereby increasing the distance of stroke of the energy absorbers.

13. A method as recited in claim 10, the seat pan pushing step further comprising decreasing a velocity of the seat pan and the buttocks of the occupant during an early portion of the crash condition and reducing energy content of the velocity of the occupant subsequently removed by the energy absorbers.

14. A method of protecting an occupant of a helicopter seat during a crash condition, comprising the steps of:

sensing the crash condition via a crash sensor;

tensioning an inertia reel strap to restrain the occupant's upper body in response to the sensed crash condition;

pushing a seat pan and a seat frame, which is in fixed engagement with the seat pan, upwards in response to the sensed crash condition; the pushing decreasing downward velocity of the seat pan and of the occupant during an early portion of a crash event indicated by the crash condition subsequently releasing the seat pan from the fixed engagement with the seat frames only earth gravity being active on the seat pan and the occupant for a period of time to precompress the spine of the seat occupant to a desired level.

* * * * *